Jan. 4, 1949. D. S. PEARSE 2,458,195
LOADER ATTACHMENT FOR TRACTORS
Filed Nov. 20, 1945 2 Sheets-Sheet 2
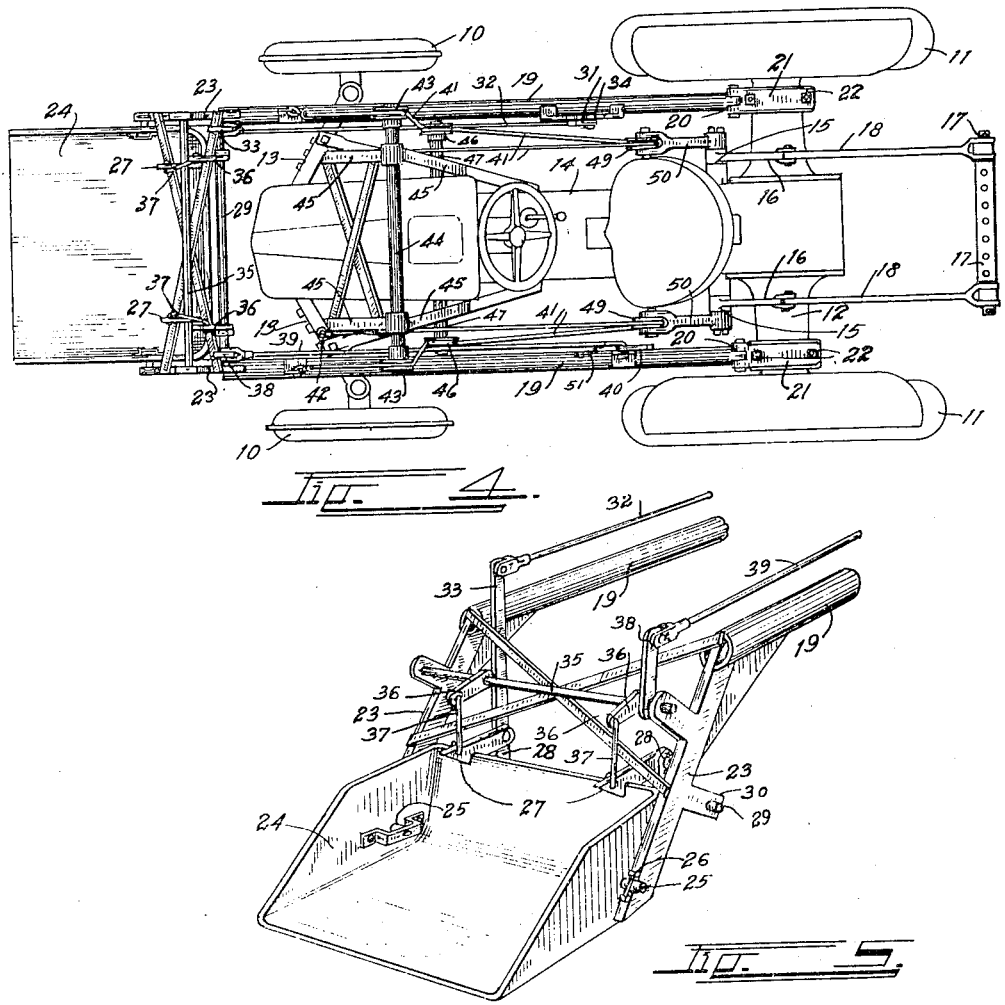
INVENTOR.
DANIEL S. PEARSE.
BY
ATTORNEY.

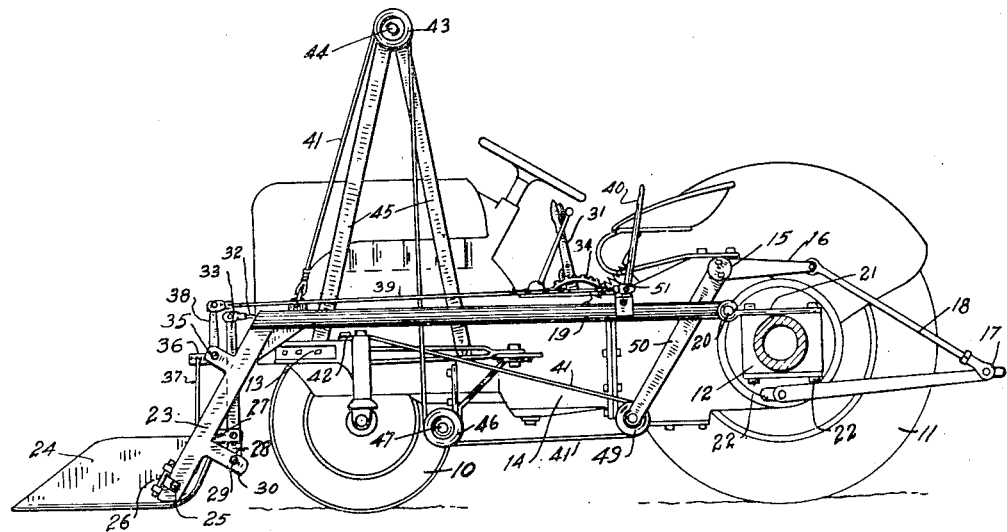
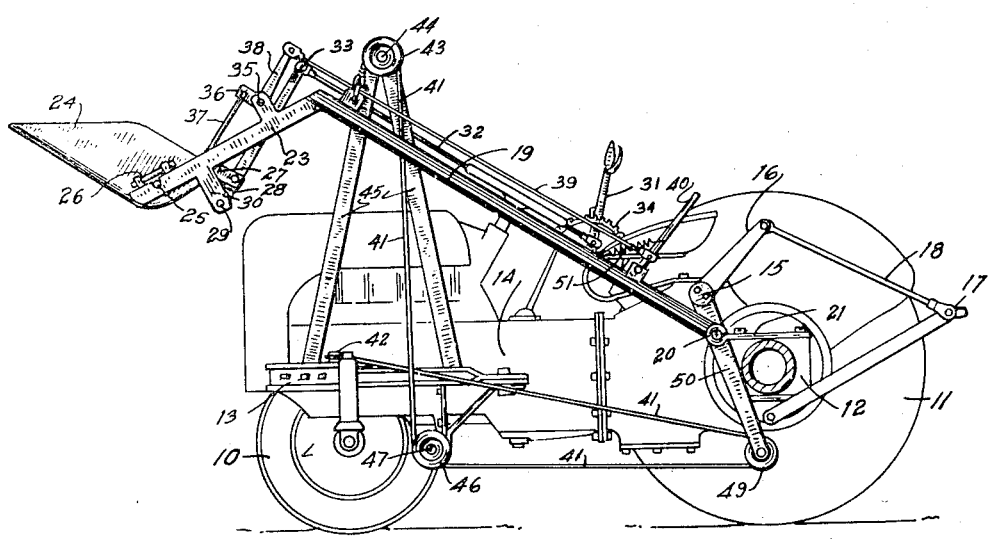
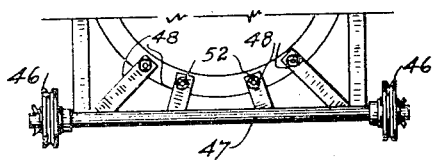
INVENTOR.
DANIEL S. PEARSE.
BY
ATTORNEY.

Patented Jan. 4, 1949

2,458,195

UNITED STATES PATENT OFFICE 2,458,195

LOADER ATTACHMENT FOR TRACTORS

Daniel S. Pearse, Wild Horse, Colo.

Application November 20, 1945, Serial No. 629,790

2 Claims. (Cl. 214—140)

This invention relates to a shovel attachment for tractors and has for its principal object the provision of a simple and efficient shovel construction which can be quickly and easily attached to or removed from a farm tractor to provide a power shovel operable from the implement lift levers of the tractor.

Another object is to provide effective means in a shovel of this type for adjusting the angle of the shovel for digging or earth retaining purposes.

A further object is to so construct the shovel that it will not interfere with use of the draw bar of the tractor for other purposes so that various implements may be attached to the tractor without it being necessary to remove the shovel therefrom.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of a typical tractor of the "Ford" type with the near rear wheel removed, illustrating the improved power shovel attachment in place thereon;

Fig. 2 is a similar view illustrating the shovel elevated to its dumping position;

Fig. 3 is a detail view illustrating an idler pulley shaft employed with the improved shovel;

Fig. 4 is a plan view of the attachment in place on a tractor; and

Fig. 5 is a detail, perspective view illustrating the method of mounting the shovel on the attachment.

Typical parts of a conventional tractor are designated in the drawing by numeral as follows: front wheels 10, rear wheels 11, rear axle housing 12, front axle 13, transmission housing 14, hydraulically-operated implement lift shaft 15, implement lift levers 16, draw bar 17, draw bar lift links 18, and transmission housing bolts 52.

The improved power shovel attachment consists of two hinged frame bars 19 positioned at each side of the tractor. The bars 19 are mounted on hinge pins 20 carried in bracket members 21 secured to the rear axle housing 12 of the tractor in any desired manner, such as by means of U-bolts 22.

The forward extremities of the frame bars 19 terminate in downwardly and forwardly extending shovel arms 23 between which a scope shovel 24 is mounted. The shovel 24 is provided with pivot studs 25 which rest in notches formed in the front edge of the shovel arms 23 and are held therein by means of removable pins 26. The studs 25 are positioned adjacent the rearward edge of the shovel so that the latter normally tends to tilt downwardly at the front.

The shovel is prevented from tilting downwardly by means of a latch hook 27 which engages the rear edge of the shovel, as shown in Fig. 4. The latch hook 27 is hinged upon the extremity of a latch lever 28, which in turn is secured on a latch shaft 29. The latch shaft 29 is journalled in projecting arms 30 on the shovel arms 23.

The latch shaft 29 can be rotated from a manual lever 31 which is swingingly mounted on one of the frame bars 19 adjacent the operator's position on the tractor. A connecting rod 32 extends from the lever 31 to an operating lever 33 fixed on the shaft 28. The lever 31 is provided with the usual locking segment 34, by means of which it may be set in any desired position.

It can be readily seen that when the lever 31 is pulled rearwardly, it will rotate the shaft 29 rearwardly, causing it to act toward the lever 28 to pull the latch 27 rearwardly to tilt the forward extremity of the shovel 24 upwardly. Thus, by operation of the lever 31, the operator can control the incline of the shovel 24.

The latch 27 can be released when desired to allow the shovel to swing to the dumping position. This is accomplished by means of a release shaft 35 journalled between the shovel arms 23 and provided with a lifting lever 36 for connection to the latch 27 in any desired manner, such as by means of a chain 37. The shaft 35 can be rotated from a manually-operated release lever 38 hinged on one of the frame bars 19 adjacent the operator's position. A connecting rod 39 extends from the release lever 38 to a lever 40 on the shaft 35.

It can be seen that when the release lever 38 is pulled rearwardly, it will act to rotate the shaft 35 to cause the latter to lift the lever 36, which in turn pulls the latch 27 from contact with the shovel 24, allowing the latter to tilt forwardly.

The forward extremities of the frame bars 19 are supported and elevated by means of flexible cables 41, there being one cable for each of the bars 19. The cables 41 extend from an attachment 42 on the bars 19 upwardly over elevated sheave wheels 43. The wheels 43 are carried on the extremities of a cross shaft 44 supported between two A-frames 45, detachably secured at each side of the tractor.

From the sheave wheels 43, the cables 41 extend rearwardly and downwardly beneath two idler sheaves 46. The sheaves 46 are mounted on the extremities of a cross shaft 47 which is secured by means of perforated arms 48 to the transmission case bolts 52 of the tractor so that the shaft 47 will extend horizontally beneath the transmission case to support one of the sheaves 46 at each side of the tractor.

From the sheaves 46 the cables 41 extend rearwardly about actuating pulleys 49. Each of the actuating pulleys 49 is mounted on the extremity of an actuating arm 50. The arms 50 are secured in any desired manner on the extremities of the implement lift shaft 15 of the tractor so that when the hydraulic implement lift of the tractor is operated, the arms 50 are swung rearwardly, as shown in Fig. 2, to carry the pulleys 49 rearwardly. From the pulleys 49, the cables 41 extend forwardly to a fixed connection with the front axle 13 of the tractor.

It can be seen that as the pulleys 49 move rearwardly, they will draw upon the cables 41, causing them to lift the forward extremities of the frame bars 19, as shown in Fig. 2 only. This lifting action is multiplied by the arrangement of the cables 41 wherein one end is fixed to the front axle 13. Thus the free extremities of the cables will move twice the distance covered by the movement of the pulleys 49.

The operation of the device is believed to be apparent from the above. The tractor is driven forwardly to force the shovel 24 into the pile of material to be moved. The implement lift of the tractor is then operated to elevate the shovel and the tractor is driven to the point where it is desired to discharge the shovel contents. At this point, the operator pulls on the lever 38 to release the latch 24 and allow the shovel to tilt, to discharge the contents.

The release lever 38 is constantly urged forwardly by means of a tension spring 51 which returns the latch 27 to its former position to engage the rear edge of the shovel.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. The combination with a power shovel of the type having a shovel pivotally mounted between the forward extremities of two arms which are hinged at their rear extremities to a vehicle, of an elevated frame on said vehicle; elevated pulleys supported by said frame; a power-operated lift shaft extending across said vehicle; an actuating lever secured on each extremity of said lift shaft; a swinging pulley on the extremity of each lever; an idler pulley at each side of said vehicle; and a pair of flexible cables each being secured at its outer extremity to one of said arms and extending to a fixed connection with said vehicle at its inner extremity, each cable extending over one of said elevated pulleys, round one of said idler pulleys, and round one of said swinging pulleys intermediate its extremities, said idler pulleys and said fixed connections being positioned to place the reaches of the cables extending to the swinging pulleys in planes substantially tangent to the arc of movement of said swinging pulleys so that the outer extremities of said cables will move substantially twice the distance covered by the swinging movement of said actuating levers.

2. The combination with a power shovel of the type having a shovel pivotally mounted between the forward extremities of two arms which are hinged at their rear extremities to a vehicle, of an elevated frame on said vehicle; elevated pulleys supported by said frame; a power-operated lift shaft extending across said vehicle; an actuating lever secured on each extremity of said lift shaft; a swinging pulley on the extremity of each lever; a flexible cable extending from each arm to a fixed connection with said vehicle, each of said cables extending over one of said elevated pulleys and around one of said swinging pulleys intermediate its extremities, so that when the swinging pulleys are actuated against said cables by said actuating levers, said arms will be lifted by said cables a distance equal to twice the arcuate movement of said swinging pulleys; manually-operated means carried by one of said arms adjacent the hinged extremity of the latter; and connecting means extending between said manually-operated means and said shovel for rotating the latter on its pivots.

DANIEL S. PEARSE.

REFERENCES CITED

The following references are of record in the file of this patent:

UNITED STATES PATENTS

| Number | Name | Date |
|---|---|---|
| 1,585,863 | Jones | May 25, 1926 |
| 2,131,961 | McAlpin | Oct. 4, 1938 |
| 2,254,292 | Jones | Sept. 2, 1941 |
| 2,306,313 | Johnson | Dec. 22, 1942 |
| 2,393,299 | Denning | Jan. 22, 1946 |
| 2,394,830 | Woodin | Feb. 12, 1946 |
| 2,397,046 | Richey | Mar. 19, 1946 |